US011816225B2

(12) United States Patent
Jarvis et al.

(10) Patent No.: US 11,816,225 B2
(45) Date of Patent: Nov. 14, 2023

(54) DOCUMENT AUTHENTICITY DETECTION IN A COMMUNICATION NETWORK

(71) Applicant: Capital One Services, LLC, McLean, VA (US)

(72) Inventors: Daniel Alan Jarvis, Vienna, VA (US); Jason Pribble, McLean, VA (US); Swapnil Patil, Vienna, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/186,370

(22) Filed: Feb. 26, 2021

(65) Prior Publication Data
US 2022/0277086 A1 Sep. 1, 2022

(51) Int. Cl.
G06F 21/60 (2013.01)
G06F 21/32 (2013.01)
(Continued)

(52) U.S. Cl.
CPC .............. G06F 21/60 (2013.01); G06F 21/32 (2013.01); H04L 67/10 (2013.01); G06F 21/602 (2013.01);
(Continued)

(58) Field of Classification Search
CPC ........ G06F 21/60; G06F 21/32; G06F 21/602; G06F 21/606
See application file for complete search history.

(56) References Cited

U.S. PATENT DOCUMENTS 8,019,116 B2 * 9/2011 Tian .................... H04N 1/32304
380/252
10,019,774 B2 7/2018 Leonard et al.
(Continued)

FOREIGN PATENT DOCUMENTS

AU 2005242135 B1 * 3/2006
IN 201911032862 A 8/2019

OTHER PUBLICATIONS

"Using Watermarks to Authenticate Video Images"—Jonathan Hak, KC, https://www.jonathanhak.com, Feb. 3, 2018 (Year: 2018).*
(Continued)

Primary Examiner — Randy A Scott
(74) Attorney, Agent, or Firm — Sterne, Kessler, Goldstein & Fox P.L.L.C.

(57) ABSTRACT

System, apparatus, device, method and/or computer program product are disclosed for detecting the authenticity of an image file transferred from a device to a server based on an image authenticity detection configuration determined by a server application. A device application is operated by a device, and a server application is operated by a server. The device application sends, to the server application, user data, device data, or environment data. The server application determines an image authenticity detection configuration to indicate one or more parameters to be used by the device to generate a first image file, and authorized changes to be made to the first image file to generate a second image file. The device application sends the second image file to the server application. The server application detects whether the received second image file contains changes matching authorized changes indicated by the image authenticity detection configuration.

19 Claims, 7 Drawing Sheets

(51) Int. Cl.
   H04L 29/08   (2006.01)
   H04L 67/10   (2022.01)
   H04L 29/06   (2006.01)
   G06T 1/00    (2006.01)

(52) U.S. Cl.
   CPC .......... *G06F 21/606* (2013.01); *G06T 1/0021* (2013.01); *G06T 1/0042* (2013.01)

(56) References Cited

U.S. PATENT DOCUMENTS

| | | |
|---|---|---|
| 10,380,562 B1 | 8/2019 | Prasad et al. |
| 2004/0086196 A1* | 5/2004 | Harrington ............ G06T 1/0071 382/276 |
| 2017/0041328 A1* | 2/2017 | Stack .................. G06F 21/6218 |
| 2018/0336656 A1 | 11/2018 | Powers et al. |
| 2019/0158698 A1* | 5/2019 | Chen ...................... H04N 19/85 |

OTHER PUBLICATIONS

"Image Authentication Using QR Code Watermarking Approach Based on Image Segmentation"—Liu et al, School of Information Science and Technology, University of Relations Beijing, Jan. 1, 2021 https://ieeexplore.ieee.org/document/9343089 (Year: 2021).*
International Search Report and Written Opinion of the International Searching Authority directed to related International Patent Application No. PCT/US2021/065520, dated Mar. 24, 2022; 14 pages.

* cited by examiner

DOCUMENT AUTHENTICITY DETECTION IN A COMMUNICATION NETWORK

BACKGROUND

Document processing can involve some or all steps from the conversion of a paper based document to an electronic or digital document (e.g., a scanned image of the document), and further into electronic information using one of, or a combination of, intelligent character recognition (ICR), optical character recognition (OCR), and any other related techniques. With the advance of internet and web based services, document processing has extended beyond processing by a computer in an office. Instead, it has become a routine practice to transfer an electronic document from a client device in one location through a communication network to a server in another location for further processing to meet various business, personal, or government needs. Understandably, a fake document or a document containing unauthorized changes can cause unintended and damaging consequences. Therefore, the authenticity of a document transferred from a client device to a server through a communication or computer network is a very important issue. Technical solutions are needed to detect the authenticity of a document received from a device through a communication network, hence increasing the security for transferring documents.

BRIEF SUMMARY

Disclosed herein are system, apparatus, device, method and/or computer program product embodiments, and/or combinations and sub-combinations thereof for detecting the authenticity of a document transferred from a client device to a server through a computer or a communication network.

In some examples, a client device, which can be simply referred to as a device, can include a storage device and a processor coupled to the storage device. The storage device is configured to store user data about a user, device data about the device, or environment data about an environment of the user or the device. A device application is operated by the processor and configured to perform various operations to facilitate a server to detect the authenticity of a document transferred to the server by the device. In detail, the device application is configured to send, to a server application operated by the server, the user data, the device data, or the environment data, and further receive, from the server application, an image authenticity detection configuration. The image authenticity detection configuration is determined by the server application based on the user data, the device data, or the environment data being sent. The image authenticity detection configuration indicates parameters to be used to generate a first image file containing a set of pixels. In some examples, the parameters used by the client device to generate the first image file containing the set of pixels include a resolution, an aspect ratio, a color depth of a pixel, or an image format for the first image file, e.g., JPEG format, Exif, TIFF, GIF, PNG, WebP format, or any other image format. In addition, the image authenticity detection configuration indicates authorized changes to be made to the first image file.

The device application is further configured to modify the first image file, based on the authorized changes to be made as indicated by the image authenticity detection configuration, to generate a second image file. The second image file contains authorized changes to the set of pixels contained in the first image file, or authorized changes to one or more other components of the first image file. Afterwards, the device application is configured to send, to the server application, the second image file. The second image file is used by the server application to identify changes contained in the second image file, validate that the identified changes contained in the second image file match the authorized changes indicated by the image authenticity detection configuration, and recover the first image file when the validation is successful.

In some examples, the device application is further configured to register the user or the device to supply at least a part of the user data or the device data to the server application. In addition, the device application is further configured to generate the first image file based on the parameters indicated by the image authenticity detection configuration, where the first image file includes the set of pixels. In some examples, the set of pixels of the first image file indicates a financial document, a bank check, a driver's license, a lease, a personal identification number, or an amount of money. Furthermore, the device application is configured to send to the server application an additional information separated from the second image file. The second image file and the additional information are used by the server application to identify changes contained in the second image file, validate that the identified changes contained in the second image file match the authorized changes indicated by the image authenticity detection configuration.

In some examples, a server can include a storage device and a processor coupled to the storage device. A server application is operated by the processor and configured to perform various operations to detect the authenticity of an image file received from a device through a computer network. In detail, the server application is configured to receive, from a device application operated on the device, user data about a user, device data about the device, or environment data about the user or the device. The server application is further configured to determine, based on the user data, the device data, or the environment data, an image authenticity detection configuration. The image authenticity detection configuration indicates one or more parameters to be used by the device to generate a first image file containing a set of pixels. The image authenticity detection configuration also indicates authorized changes to be made to the first image file. The authorized changes to be made to the first image file includes authorized changes to the set of pixels contained in the first image file, or authorized changes to one or more other components of the first image file. The server application is further configured to send, to the device application, the image authenticity detection configuration; receive, from the device application, a second image file; and verify the received second image file conforms with the one or more parameters to be used to generate the first image file as indicated by the image authenticity detection configuration. In addition, the server application is configured to identify changes contained in the received second image file, based on the authorized changes to be made to the first image file as indicated by the image authenticity detection configuration. Afterwards, the server application is configured to validate that the identified changes contained in the second image file match the authorized changes to be made to the first image file as indicated by the image authenticity detection configuration. When the validation is successful, the server application is configured to recover the first image file from the received second image file.

Descriptions provided in the summary section represent only examples of the embodiments. Other embodiments in the disclosure may provide varying scopes different from the description in the summary. In some examples, systems and computer program products of the disclosed embodiments may include a computer-readable device storing computer instructions for any of the methods disclosed herein or one or more processors configured to read instructions from the computer readable device to perform any of the methods disclosed herein.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
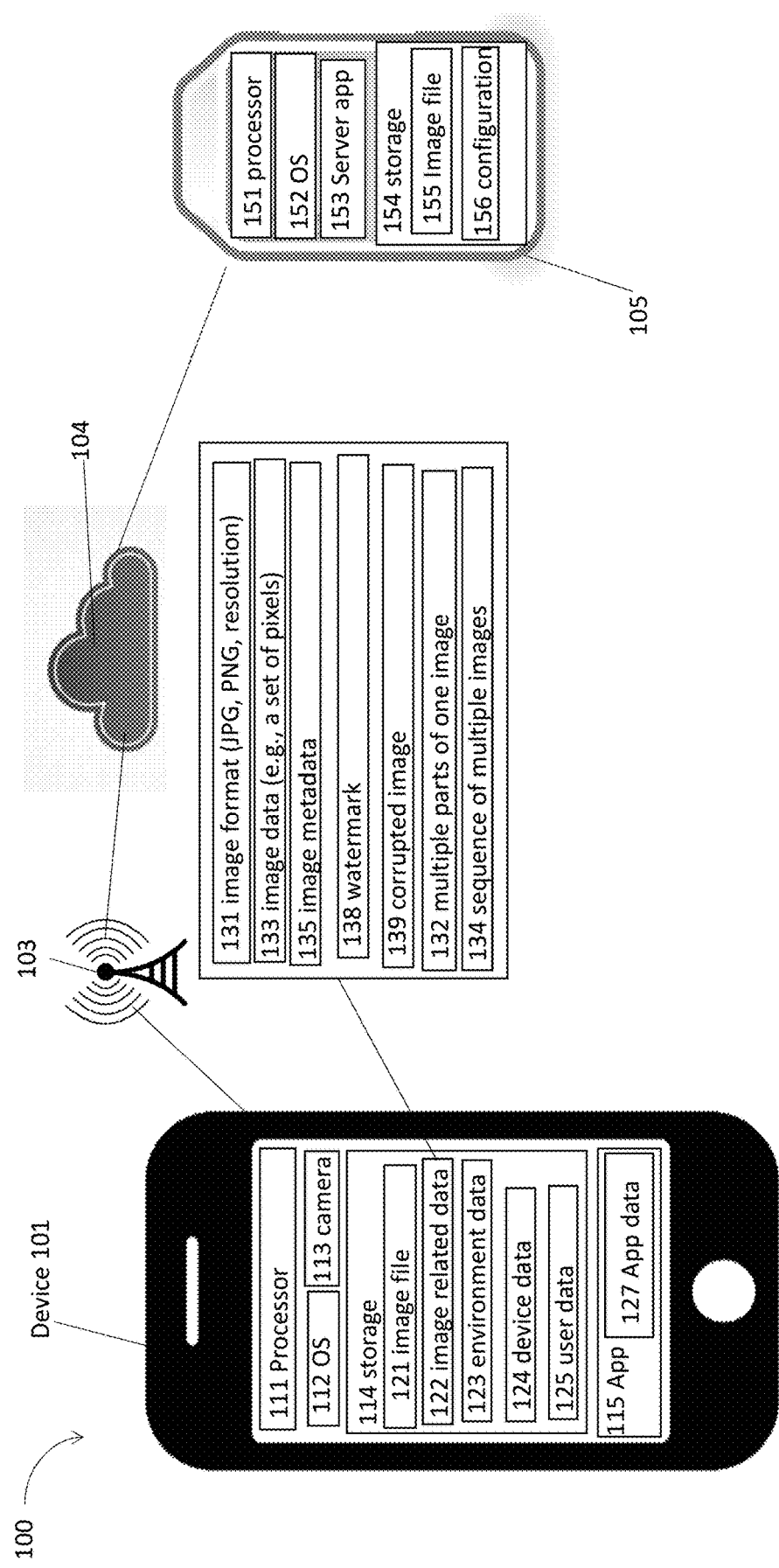
FIG. 1 is a block diagram of a system for detecting the authenticity of an image file transferred from a client device to a server based on an image authenticity detection configuration determined by a server application, according to an embodiment of the disclosure.

The disclosed embodiments are related to the authenticity detection of documents transferred from a client device, which can be simply referred to as a device, to a server through a communication network. The terms "computer network", "communication network", or "network" are used interchangeably. Similarly, a "document," a "digital document," an "electronic document," or a "document file" are used interchangeably. A document can be a file including text content, image or graphic content, audio content, video content, or any other digital contents. A document can be a file converted from a non-digital document, e.g., a paper document, or a file generated by a computer. A document can be in any of the file format, e.g., a word processing format including doc format, PDF format; an image format including joint photographic experts group (JPEG) related format, exchangeable image file format (Exif), tagged image file format (TIFF), graphics interchange format (GIF), portable network graphics (PNG) format, WebP format, or other image format; or a multimedia file format including mp3 audio format, mp4 audio format, avi video format, wmv video format, or any other document format. In the description herein, an image file is used as an example of any document. Techniques, operations, or descriptions provided herein related to an image file can be equally applicable to any document. For example, techniques described herein can be equally applicable and easily adapted to a multimedia file, e.g., a video file, with no changes or minor changes, which are known to a person having ordinary skills in the art.

Authenticity detection of an image file has been studied for a long time. Techniques for detecting authenticity of an image file can include encryption techniques, watermarking, digital signature, and many other techniques. Such techniques can be performed on an image file to change the image file to a different file, e.g., a file with an added watermark. A client device alone can decide what kind of encryption or watermark is going to be performed, and what kind of parameters to be used in the encryption or watermarking of the image file. Afterwards, the client device can transfer the encrypted or watermarked image file to another device, e.g., a server. However, the encryption or watermark performed on the image file by the client device may be known to other users or devices. With such knowledge, other users or devices can perform the same encryption or watermark using the same parameters on some fake image files. When a server receives an encrypted or watermarked image file, there is a chance that the encrypted or watermarked image file is made by other devices on some fake image files. Hence, the server may not be able to accurately detect the authenticity of an image file in such cases.

The current disclosure discloses techniques for detecting the authenticity of an image file transferred from a client device to a server through a communication network. Encryption or watermarking can still be performed on an image file by the client device. However, the client device may only perform encryption or watermarking operations, but does not decide what kind of encryption or watermarking operations to be performed. Instead, the server can decide what kind of encryption or watermarking operations to be performed on an image file by the device. A server application operating on the server can use an image authenticity detection configuration to indicate the choices of encryption or watermarking operations, or any authorized changes to be made to an image file before transferring the image file to the server. Furthermore, the image authenticity detection configuration is determined by the server application based on user data about a user, device data about the device, or environment data about an environment of the user or the device. Therefore, for a same user or same device, it is possible the server application can determine a different image authenticity detection configuration at different times. Accordingly, the client device can perform authorized changes to an image file, e.g., encryption, watermarking, or other form of authorized changes, in a way indicated by the image authenticity detection configuration, instead of using one fixed mechanism to encrypt or watermark an image file. In fact, the device itself does not even know what kind of encryption or watermarking operations to implement before receiving the image authenticity detection configuration determined by the server application. The dynamic nature of the image authenticity detection configuration determined by the server application increases the reliability for detecting the authenticity of the image file transferred from the client device to the server.

Accordingly, embodiments herein include a device application operated by a processor of a device, and a server application operated by a processor of a server, both applications working together to detect the authenticity of a document or an image file transferred from the device to the server. The device application can send, to the server application, user data about a user, device data about the device, or environment data about an environment of the user or the device. Based on the user data, the device data, or the environment data, the server application determines an image authenticity detection configuration. The image authenticity detection configuration indicates one or more parameters to be used by the device to generate a first image file containing a set of pixels. The image authenticity detection configuration also indicates authorized changes to be made to the first image file. The device application further modifies the first image file, based on the authorized changes to be made as indicated by the image authenticity detection configuration, to generate a second image file. The second image file contains authorized changes to the set of pixels contained in the first image file, or authorized changes to one or more other components of the first image file. Afterwards, the device application sends, to the server application, the second image file. The server application receives, from the device application, the second image file, and identifies changes contained in the second image file, based on the authorized changes to be made to the first image file as indicated by the image authenticity detection configuration. Afterwards, the server application validates that the identified changes contained in the second image file match the authorized changes to be made to the first image file as indicated by the image authenticity detection configuration. When the validation is successful, the server application recovers the first image file from the received second image file.

The embodiments disclosed herein present improvements in the functions of a computer network and/or computer security, so that the systems and methods can detect unauthorized changes previous ad hoc systems may fail to detect. In addition, the operations may be implemented with a particular machine including a server and a device to perform operations in certain specific orders, as shown in more details in FIGS. 2-4. The operations further effect a transformation of a particular article to a different state or things. In detail, the device application can modify a first image file, based on the authorized changes to be made as indicated by the image authenticity detection configuration, to generate a second image file, and further transfer to the server application, the second image file. On the other hand, the server application can identify changes contained in the received second image file, based on the authorized changes to be made to the first image file as indicated by the image authenticity detection configuration, and further recover the first image file from the received second image file when it is determined no unauthorized changes exist on the received second image file.

Techniques disclosed in the current disclosure can be applied to improve the security in various transactions. For example, the disclosed system including the device application and the server application can detect whether or not a remotely deposited check by a bank customer using a smart phone to a bank account operated on a server contains any unauthorized changes, e.g., the change on the dollar amount of the check. Similarly, the disclosed system including the device application and the server application can detect whether or not a mortgage document, a lease, a legal document, an identity document (e.g. identification card, license, or passport) or any other business document or legal document transferred from the device to the server contains any unauthorized changes. The disclosed system can be used in a wide variety of environments, e.g., business environments, government environments, or personal environments.

The technology disclosed herein can be applied to improve the security in business, legal, or government transactions. In particular, the techniques can be applied between a device owned by a single user for personal usage and a server. Furthermore, in making the authorized changes to the image file according to the image authenticity detection configuration, certain mathematical concepts may be employed. However, such mathematical concepts are detailed operations to facilitate the improvement of technologies and are integrated into the computer systems for detecting image authenticity. The overall systems and methods are not directed to such mathematical concepts.

FIG. 1 is a block diagram of a system 100 for detecting the authenticity of an image file 155 transferred from a device 101 to a server 105 based on an image authenticity detection configuration 156 determined by a server application 153, according to an embodiment of the disclosure. In the embodiment of FIG. 1, the system 100 includes the device 101 and the server 105. The device 101 can be a smart phone or a wireless device that wirelessly communicates with a base station 103, and further communicatively coupled to the server 105 through a cloud computing system 104. The system 100 is only for illustration purpose and is not limiting. There can be other configurations for the system 100. For example, the device 101 can be communicatively coupled to the server 105 through a communication cable without going through the base station 103 or the cloud computing system 104.

In some examples, the system 100 can include a network formed by some or all of the device 101, the server 105, the base station 103, and the cloud computing system 104. For example, the system 100 can include an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

In some examples, the base station 103 can include a node configured to operate based on a wide variety of wireless communication techniques such as, but not limited to, techniques based on 3GPP standards. For example, the base station 103 can be a fixed station, and may also be called a base transceiver system (BTS), an access point (AP), a transmission/reception point (TRP), an evolved NodeB (eNB), a next generation node B (gNB), or some other equivalent terminology. The system 100 can operate using both licensed cellular spectrum (known as in-band communication) and unlicensed spectrum (known as out-band communication).

In some examples, the cloud computing system 104 can include an environment that delivers computing as a service, whereby shared resources, services, etc. The cloud computing system 104 can provide computation, software, data access, storage, and/or other services that do not require end-user knowledge of a physical location and configuration of a system and/or a device that delivers the services.

In some examples, the device 101 can be a wireless communication device, a smart phone, a laptop, a desktop, a tablet, a personal assistant, a wearable device, an Internet of Things (IoTs), a vehicle's communication device, a mobile station, a subscriber station, a remote terminal, a wireless terminal, a user device, a monitor, a television, or the like. The device 101 can be configured to operate based on a wide variety of wireless communication techniques. These techniques can include, but are not limited to, techniques based on 3rd Generation Partnership Project (3GPP) standards using Rel-16, Rel-17 or later.

In some examples, the device 101 can include a processor 111, an operating system 112, a camera 113, a storage device 114 coupled to the processor 111, and a device application 115 operated by the processor 111. The device application 115 can include an additional information 127, e.g., an application data stored in memory when the device application 115 is in operation. The storage device 114 can store user data 125 about a user, device data 124 about the device 101, or environment data 123 about an environment of the user or the device. The user data 125 can include information about a fingerprint of the user, a user biometric data, a user date of birth, or an identification number associated with the user. The device data 124 can include information about a camera installed on the device, e.g., the camera 113, resolutions of the camera 113, a device model number, or a device operating system information, e.g., the operating system 112. The environment data 123 can include a time when the device 101 sends to the server application 153 the user data 125, the device data 124, or the environment data 123, or a location where the user is located.

Figure 3A:
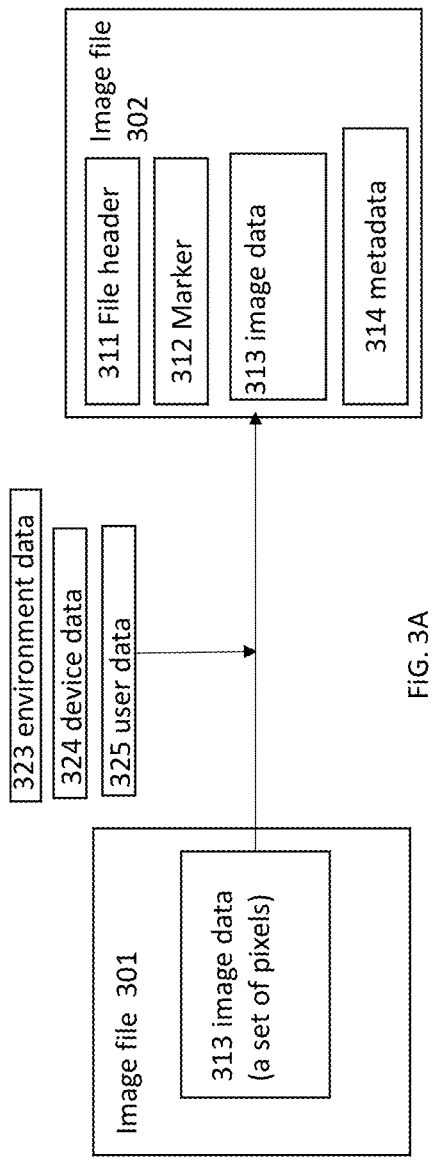
FIGS. 3A-3C illustrate various authorized changes to be made to an image file to facilitate the detection of image authenticity when the image file is transferred from a client device to a server, according to an embodiment of the disclosure.
Figure 3B:
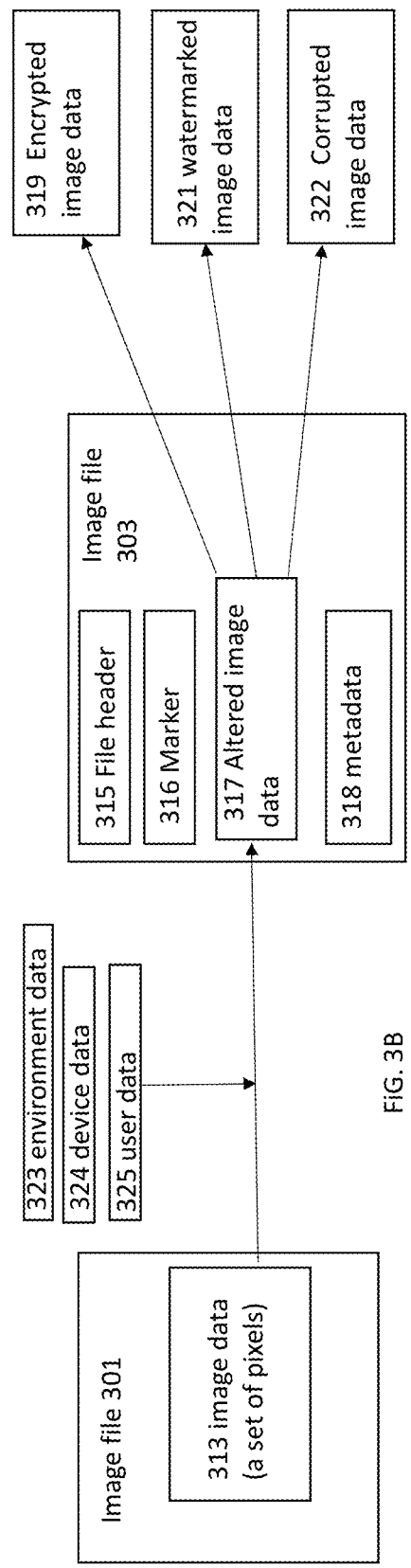
Figure 3C:
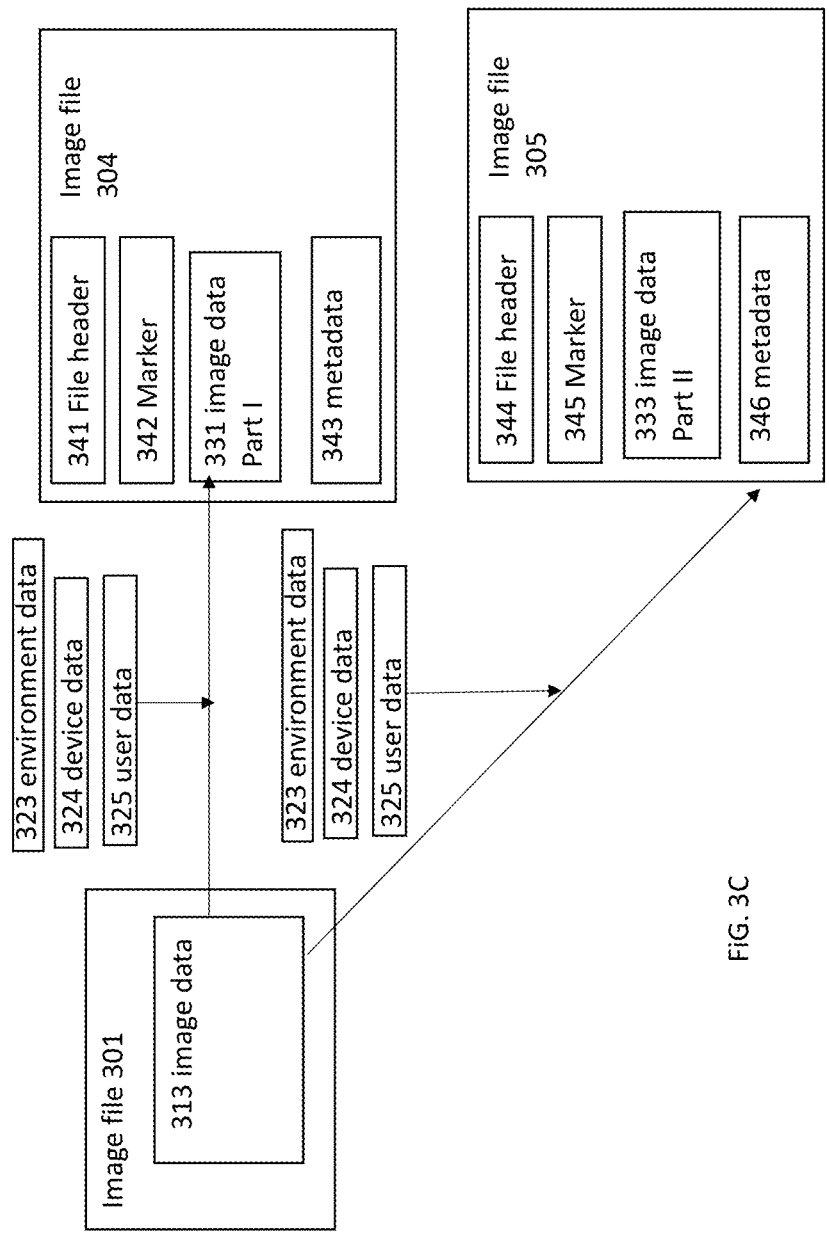
Figure 4:
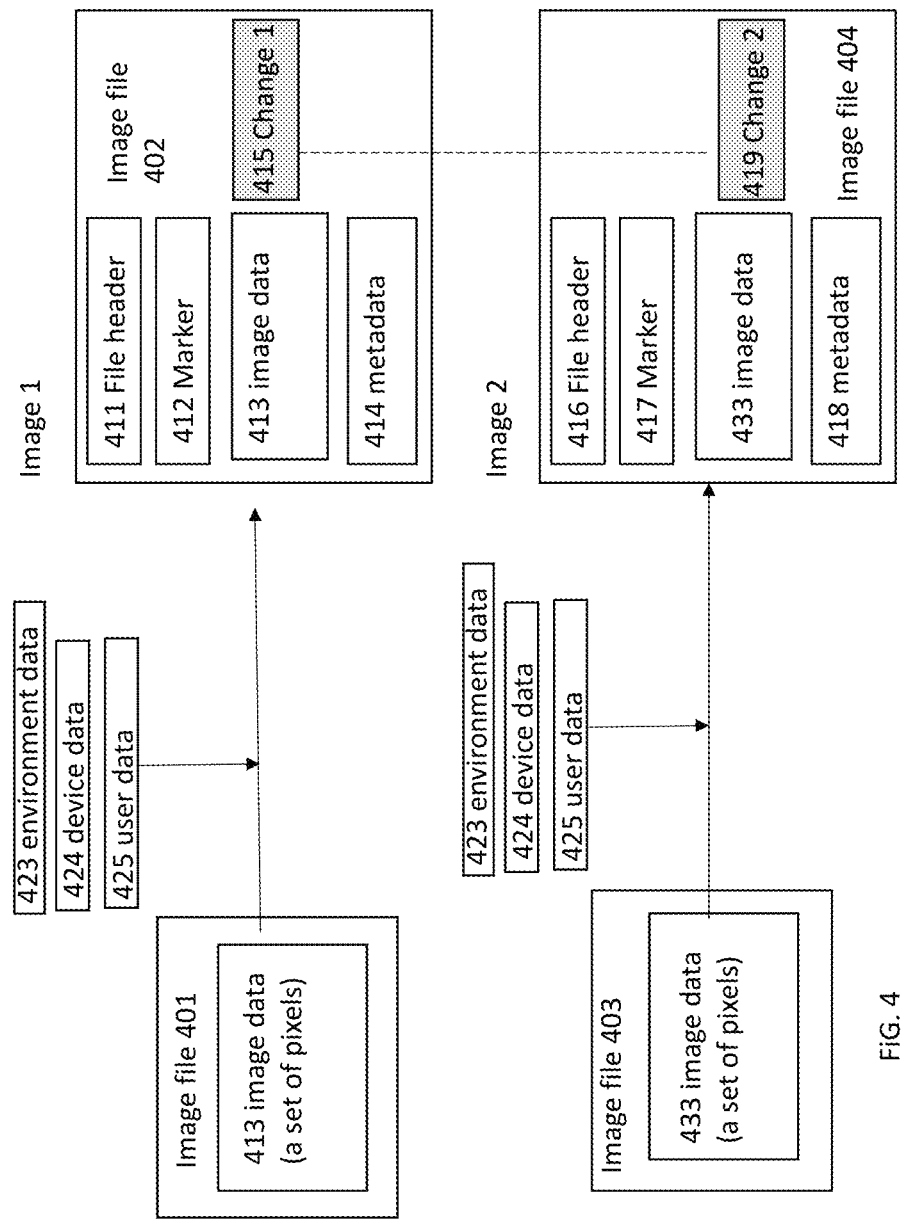
FIG. 4 illustrates various authorized changes to be made to an image file to facilitate the detection of image authenticity when the image file is transferred from a client device to a server, according to an embodiment of the disclosure.

In some examples, the storage device 114 can further store an image file 121, and/or image related data 122. In more detail, the image related data 122 can include image format information 131, image data 133 that may include a set of pixels, image metadata 135, watermark data 138, corrupted image data 139, etc. The set of pixels of the image data 133 can indicate a financial document, a bank check, a driver's license, a lease, a personal identification number, an amount of money, or any other documents used in daily life. The image format information 131 can include a JPEG related format, an Exif format, a TIFF, a GIF, a PNG format, a WebP format, or many other image formats specified by various image standards or used in practices. Furthermore, the image related data 122 can include data 132 related to multiple parts of an image, or data 134 related to multiple images. More details of the data 132 related to multiple parts of an image are shown in FIG. 3C, while details of the data 134 related to multiple images are shown in FIG. 4. The classification of various data shown for the image file 121 and the image related data 122 are for illustration purpose only, and are not limiting. For example, the image related data 122 may be entirely or partially contained in the image file 121. When the image file 121 is not a real image but another format of document, e.g., a word processing format including doc format, PDF format; or a multimedia file format including mp3 audio format, mp4 audio format, avi video format, wmv video format, the image file 121 and/or the image related data 122 can be in different forms and classes. Details of the variations and differences for different image file format are known to a person having ordinary skills in the art, as would be discussed by any relevant textbook.

In some examples, the server 105 can include a server device (e.g., a host server, a web server, an application server, etc.), a data center device, or a similar device. The server 105 can include a processor 151, an operating system 152, the server application 153 operated by the processor 151, a storage device 154 coupled to the processor 151. In addition, the server 105 can receive an image file from the device 101 and save the received image file as the image file 155 into the storage device 154. Furthermore, the server 105 can store the image authenticity detection configuration 156 in the storage device 154. The image authenticity detection configuration 156 can be determined by the server application 153 based on the user data 125, the device data 124, or the environment data 123 being sent from the device 101. The image authenticity detection configuration 156 can indicate parameters to be used by the device 101, e.g., by the camera 113, to generate a first image file containing a set of pixels, and authorized changes to be made to the first image file generated by the device 101. In some examples, the parameters used by the device 101 to generate the first image file containing the set of pixels include a resolution, an aspect ratio, a color depth of a pixel, or an image format for the first image file. The image authenticity detection configuration 156 can further indicate the authorized changes to the set of pixels contained in the first image file, or the authorized changes to the one or more other components of the first image file. More details of the authorized changes are shown in FIGS. 3A and 3B.

Figure 2:
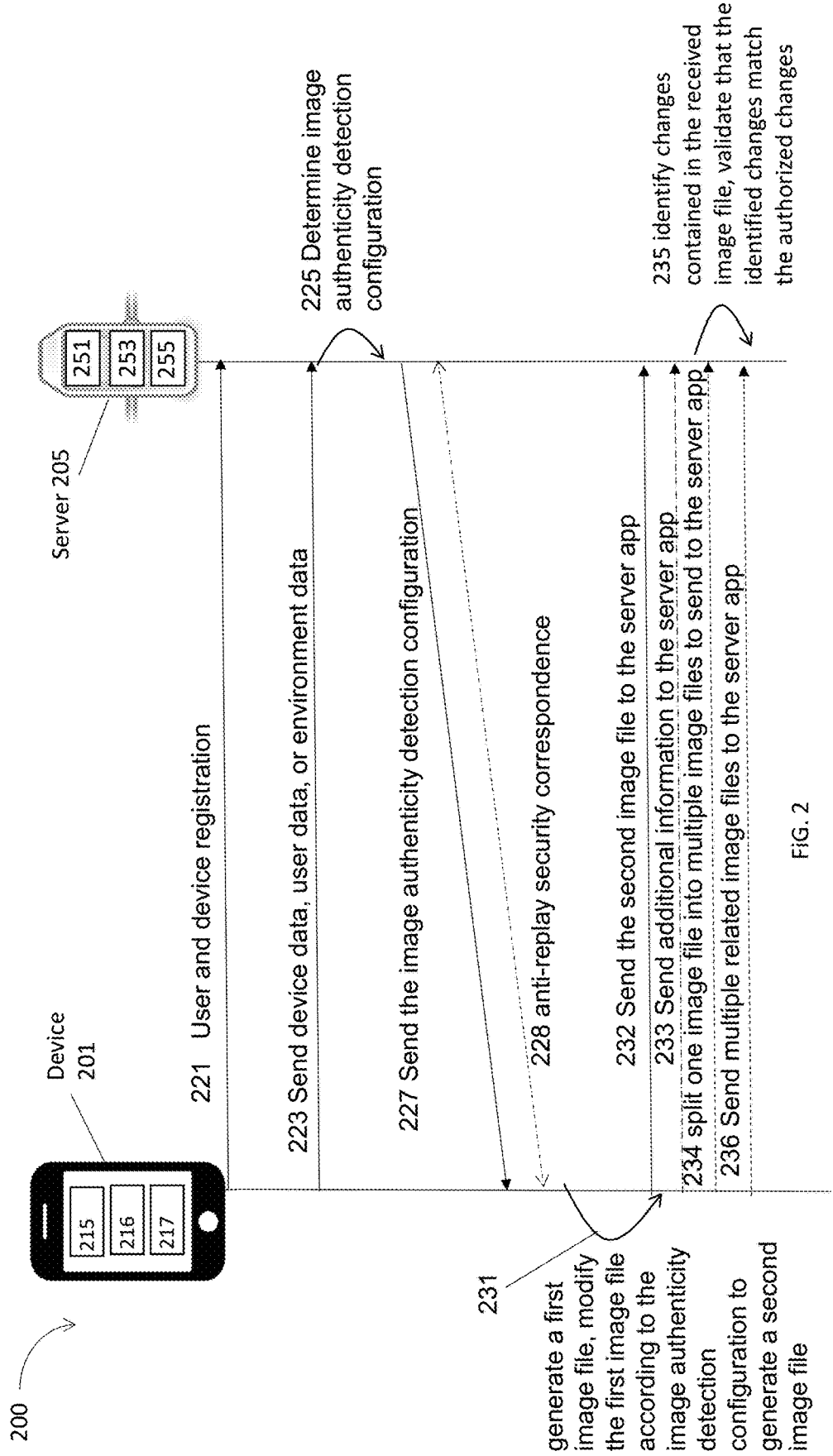
FIG. 2 illustrates an example process for detecting the authenticity of an image file transferred from a client device to a server based on an image authenticity detection configuration determined by a server application, according to an embodiment of the disclosure.

FIG. 2 illustrates an example process 200 with detailed operations for detecting the authenticity of an image file transferred from a client device 201 to a server 205 based on an image authenticity detection configuration determined by a server application 251, according to an embodiment of the disclosure. The device 201 includes a device application 215, a first image file 216, and a second image file 217, while the server 205 includes the server application 251, an image authenticity detection configuration 253, and a received image file 255. The system 200, the client device 201, the server 205, the device application 215, the server application 251, and the image authenticity detection configuration 253 can be examples of the system 100, the client device 101, the server 105, the device application 115, the server application 153, and the image authenticity detection configuration 156, as shown in FIG. 1. The image authenticity detection configuration 255 can indicate various authorized changes to be made to the first image file 216 to obtain the second image file 217. FIGS. 3A-3C illustrate in more detail various authorized changes to be made to the first image file 216 to obtain the second image file 217. In addition, FIG. 4 illustrates in more detail authorized changes with a correlation relationship to be made to two image files.

At 221, the device application 215 can register a user or the device 201 to supply at least a part of user data about the user or device data about the device 201 to the server application 251. Similarly, the server application 251 can receive at least a part of the user data or the device data during the registration process for the user or the device 201. Information supplied at the registration operation can be some permanent information, e.g., the model number of the device 201 that cannot be changed after being manufactured, or the user's birthday. Other temporary information of the user data or the device data can be supplied at different occasions. Operations at 221 can be optional. The system 200 can grant higher trust levels to devices or users that have been registered at 221, compared to devices and users not registered.

At 223, the device application 215 can send, to the server application 251, user data, device data, or environment data about the user or the device, similar to the user data 125, the device data 124, or the environment data 123 as shown in FIG. 1. Accordingly, the server application 251 can receive, from the device application 215, the user data, the device data, or the environment data.

At 225, the server application 251 can determine, based on the user data, the device data, or the environment data, the image authenticity detection configuration 253. The image authenticity detection configuration 253 indicates one or more parameters to be used by the device 201 to generate the first image file 216 containing a set of pixels, and authorized changes to be made to the first image file 216. The authorized changes to be made to the first image file 216 can include authorized changes to the set of pixels contained in the first image file 216, or authorized changes to one or more other components of the first image file 216. More details of the authorized changes are shown in FIGS. 3A-3C.

At 227, the server application 251 can send, to the device application 215, the image authenticity detection configuration 253. The device application 215 can receive, from the server application 251, the image authenticity detection configuration 253.

At 228, the server application 251 can provide, to the device application 215, a nonce generated based on a security hash function and the user data, the device data, or the environment data. Such a nonce is provided for the purpose of preventing replay attack by others. Operations at 228 may include communications between the server application 251 and the device application 215 to setup various security features. For example, additional encryption related operations may be performed.

At 231, the device application 215 can generate the first image file 216 based on the parameters indicated by the image authenticity detection configuration 253. In some examples, the first image file 216 can include the set of pixels. The first image file 216 can be generated by another application operating on the device 201. In addition, the device application 215 can modify the first image file 216, based on the authorized changes to be made as indicated by the image authenticity detection configuration 253, to generate the second image file 217. FIGS. 3A-3C illustrate additional details of various authorized changes that may be made to the first image file 216 to generate the second image file 217.

In some examples, as shown in FIGS. 3A-3C, the device application 215 can generate a first image file 301, where the first image file 301 contains a set of pixels 313. The first image file 301 can be similar to the first image file 216. The first image file 301 can be generated based on the parameters indicated by the image authenticity detection configuration 253. The parameters used to generate the first image file 301 include a resolution, an aspect ratio, a color depth of a pixel, an image format for the first image file 301, or any other image file parameters. The first image file 301 may or may not contain some additional image data besides the set of pixels 313. For example, the first image file 301 can optionally include file header, marker, and metadata, which are not shown.

In some examples, as shown in FIG. 3A, the device application 215 can modify the first image file 301 based on the authorized changes to be made as indicated by the image authenticity detection configuration 253, to generate a second image file 302. The second image file 302 can include a file header 311, a marker 312, the set of pixels 313, and a metadata 314. Similarly, the first image file 301 can include file header, marker, and metadata as well, not shown. The second image file 302 can include authorized changes made to one or more components of the first image file 301. For example, the authorized changes can include adding embedded data to the file header of the first image file 301 to obtain the file header 311, or adding embedded data to the metadata of the first image file 301 to obtain the metadata 314. The embedded data can be generated according to the image authenticity detection configuration 253, and user data 325, device data 324, or environment data 323. The user data 325, the device data 324, or the environment data 323 can be similar to the user data 125, the device data 124, or the environment data 123 as shown in FIG. 1.

In some examples, as shown in FIG. 3B, the device application 215 can modify the first image file 301 based on the authorized changes to be made as indicated by the image authenticity detection configuration 253, to generate a second image file 303. The second image file 303 can include a file header 315, a marker 316, a set of image data 317, and a metadata 318. Similarly, the first image file 301 can include file header, marker, and metadata as well, not shown, which may be the same as the file header 315, the marker 316, and the metadata 318. In some examples, the file header, marker, and metadata contained in the first image file 301 can be different from the file header 315, the marker 316, and the metadata 318. For example, the file header 315, the marker 316, and the metadata 318 can be obtained by performing authorized changes on the file header, marker, and metadata contained in the first image file 301 as shown in FIG. 3A.

In some examples, as shown in FIG. 3B, the second image 303 can include authorized changes made to one or more components of the first image file 301, e.g., to make changes to the set of pixels 313 to generate the set of image data 317. For example, the authorized changes to the set of pixels 313 can include encrypting the set of pixels 313 by encryption parameters determined by the server application to generate an encrypted image data 319, corrupting the set of pixels 313 by ways determined by the server application to generate a corrupted image data 322, or adding to the set of pixels 313 one or more watermarks determined by the server application to generate a watermarked image data 321. The encryption, the corruption, or watermarking of the set of pixels 313 can be performed based on the image authenticity detection configuration 253, and user data 325, device data 324, or environment data 323. For example, the authorized changes to the set of pixels 313 contained in the first image file 301 can include adding one or more watermarks to the set of pixels 313 according to the image authenticity detection configuration 253. In some examples, a watermark can include a visible text related to the parameters used to generate the first image file 301, an extra line of transparent pixels along one or more borders of an image displayed based on the first image file 301, or one or more alterations to the set of pixels 313 contained in the first image file 301 to meet a predetermined distribution of white balance scores.

In some examples, as shown in FIG. 3C, the device application 215 can modify the first image file 301 based on the authorized changes to be made as indicated by the image authenticity detection configuration 253, to generate a second image file 304 and a third image file 305. The first image file 301 contains the set of pixels 313, the second image file 304 contains a set of pixels 331, and the third image file 305 contains a set of pixels 333, where the set of pixels 331 and the set of pixels 333 are both a subset of the set of pixels 313. In other words, the device application 215 can split the first image file 301 into two separated image files, the second image file 304 and the third image file 305. In addition, the second image file 304 can include a file header 341, a marker 342, and a metadata 343. Similarly, the third image file 305 can include a file header 344, a marker 345, and a metadata 346. Furthermore, the first image file 301 can include a file header, a marker, and a metadata, not shown. In some examples, the file header, marker, and metadata contained in the first image file 301 can be different from the file header 341, the marker 342, and the metadata 343, or the file header 344, the marker 345, and the metadata 346. For example, the file header 341, the marker 342, and the metadata 343, or the file header 344, the marker 345, and the metadata 346 can be obtained by performing authorized changes on the file header, marker, and metadata contained in the first image file 301, based on the image authenticity detection configuration 253, and user data 325, device data 324, or environment data 323, as shown in FIG. 3A.

In some examples, the first image file 301 can be an example of the first image file 216 shown in FIG. 2. In addition, the second image file 302, the second image file 303, the second image file 304, or the third image file 305, can be an example of the second image file 217 shown in FIG. 2.

Back to FIG. 2, at 232, after generating the second image file 217 including authorized changes as indicated by the image authenticity detection configuration 253, the device application 215 can send, to the server application 251, the second image file 217. Accordingly, the server application 251 can receive, from the device application 215, the second image file 217. When the server application 251 receives the second image file 217, the server application 251 can save the received image file as the received image file 255 in a storage device of the server 205. The received image file 255 may or may not be the same as the second image file 217 when it is sent, due to various security attacks or communication errors. The server application 251 can determine whether the received image file 255 is indeed the same as the second image file 217.

At 235, the server application 251 can verify that the received image file 255 conforms with the one or more parameters used to generate the first image file 216 as indicated by the image authenticity detection configuration 253. If the received image file 255 does not conform with the one or more parameters used to generate the first image file 216, then it's likely that the received image file 255 is not an authentic image file. On the other hand, if the received image file 255 is indeed the second image file 217, the received image file 255 should conform with the one or more parameters used to generate the first image file 216. In addition, the received image file 255 can contain the authorized changes made to the first image 216. Hence, the server application 251 can identify changes contained in the received image file 255, based on the authorized changes to be made to the first image file 216 as indicated by the image authenticity detection configuration 253. After the changes have been identified, the server application 251 can validate that the identified changes contained in the received image file 255 match the authorized changes to be made to the first image file 216 as indicated by the image authenticity detection configuration 253. When the validation is successful, the server application 251 can recover the first image file 216 from the received image file 255. More details of operations carried out by the server application 253 at 235 can be illustrated in FIG. 5.

At 233, the device application 215 can optionally send to the server application 251 additional information, e.g., information similar to the additional information 127 contained in the device application 115 as shown in FIG. 1. The additional information can be separated from the second image file 217. In other words, the image authenticity detection configuration can indicate additional information to be sent to the server application 251 separately in addition to authorized changes contained in the second image file 217. Accordingly, the server application 251 can receive, from the device application 215, the additional information separated from the second image file 217. Hence, at 235, the server application 251 can identify changes contained in the received image file 255, based on the authorized changes to be made to the first image file 216 as indicated by the image authenticity detection configuration 253, and the additional information received from the device application 215. After the changes have been identified, the server application 251 can validate that the identified changes contained in the received image file 255 match the authorized changes to be made to the first image file 216 as indicated by the image authenticity detection configuration 253. When the validation is successful, the server application 251 can recover the first image file 216 from the received image file 255.

At 234, in some embodiments, the device application 215 can split the first image file 216 into multiple image files, e.g., the second image file 217 and a third image file, to send to the server application 251. Operations at 234 can happen when the authorized changes to the first image file 216 is to split the first image file 216 into two separated image files as illustrated in FIG. 3C, where the first image file 301 is split into the second image file 304 and the third image file 305. Accordingly, the server application 251 can receive, from the device application 215, the second image file 217 and a third image file. Hence, at 235, the server application 251 can identify changes contained in the two received image files, based on the authorized changes to be made to the first image file 216 as indicated by the image authenticity detection configuration 253. After the changes have been identified, the server application 251 can validate that the identified changes contained in the two received image files match the authorized changes to be made to the first image file 216 as indicated by the image authenticity detection configuration 253. When the validation is successful, the server application 251 can recover the first image file 216 from the two received image files.

The image authenticity detection configuration 253 can introduce additional embodiments for detecting the authenticity of an image file transferred from the device 201. In some examples, at 231, in addition to the first image file 216, the device application 215 can generate a third image file based on the parameters indicated by the image authenticity detection configuration 253. Furthermore, the device application 215 can modify the third image file, based on the authorized changes indicated by the image authenticity detection configuration 253, to generate a fourth image file. The fourth image file can contain authorized changes to a set of pixels contained in the third image file, or authorized changes to one or more other components of the third image file. In addition, the authorized changes contained in the fourth image file can be correlated to authorized changes contained in the second image file 217 based on a correlation relationship determined by the image authenticity detection configuration. More details are shown in FIG. 4.

In some examples, as shown in FIG. 4, the device application 215 can generate a first image file 401, where the first image file 401 contains a set of pixels 413. The first image file 401 can be similar to the first image file 216. The device application 215 can modify the first image file 401 based on the authorized changes to be made as indicated by the image authenticity detection configuration 253, to generate a second image file 402. The second image file 402 can include a file header 411, a marker 412, the set of pixels 413, and a metadata 414. In addition, the second image file 402 can include a first change 415, which may be a change to any of the components of the first image file 401. For example, the first change 415 can be contained in the file header 411, the marker 412, the set of pixels 413, and/or the metadata 414. In addition, the first change 415 can be determined based on the image authenticity detection configuration 253, user data 425, device data 424, or environment data 423. The user data 425, the device data 424, or the environment data 423 can be similar to the user data 125, the device data 124, or the environment data 123 as shown in FIG. 1.

In addition, the device application 215 can generate a third image file 403, where the third image file 403 contains a set of pixels 433. The third image file 403 can be similar to the first image file 216. The device application 215 can modify the third image file 403 based on the authorized changes to be made as indicated by the image authenticity detection configuration 253, to generate a fourth image file 404. The fourth image file 404 can include a file header 416, a marker 417, the set of pixels 433, and a metadata 418. In addition, the fourth image file 404 can include a second change 419, which may be a change to any of the components of the third image file 403. For example, the second change 419 can be contained in the file header 416, the marker 417, the set of pixels 433, and/or the metadata 418. In addition, the second change 419 can be determined based on the image authenticity detection configuration 253, user data 425, device data 424, or environment data 423.

In some examples, the first image file 401 and the third image file 403 can be related. For example, the first image file 401 can be one side of a check being deposited, and the third image file 403 can be another side of the check being deposited. Alternatively, the first image file 401 can be a first page of a document, and the third image file 403 can be a page immediately after the first page of the document. Accordingly, the first change 415 and the second change 419 can satisfy the correlation relationship determined by the image authenticity detection configuration 253. The correlation relationship can be any predetermined mathematical relationship, or other relationship between the first change 415 and the second change 419.

Accordingly, the device application 215 can generate the first image file 216 and the third image file described above, and further modify the first image file 216 to become the second image file 217, and modify the third image file to become the fourth image file. Hence, at 236, in some embodiments, the device application 215 can send, to the server application 251, multiple related image files, e.g., the second image file 217 and the fourth image file. Accordingly, the server application 251 can receive, from the device application 215, two received image files, corresponding to the second image file 217 and the fourth image file. Hence, at 235, the server application 251 can identify a first change and a second change contained in the two received image files, corresponding to the second image file 217 and the fourth image file generated by the device application 215. After the changes have been identified, the server application 251 can validate that the identified changes contained in the received image file 255 match the authorized changes to be made to the first image file 216 as indicated by the image authenticity detection configuration 253, and further validate that the identified changes contained in the second received image file match the authorized changes to be made to the third image file as indicated by the image authenticity detection configuration 253. In addition, the server application 251 can validate the first change and the second change satisfy the correlation relationship determined by the image authenticity detection configuration 253. Hence, when two images files are sent in sequence, there is an additional layer of protection for detecting authenticity of both image files. When the validation is successful, the server application 251 can recover the first image file 216 and the third image file from the two received image files.

Figure 5:
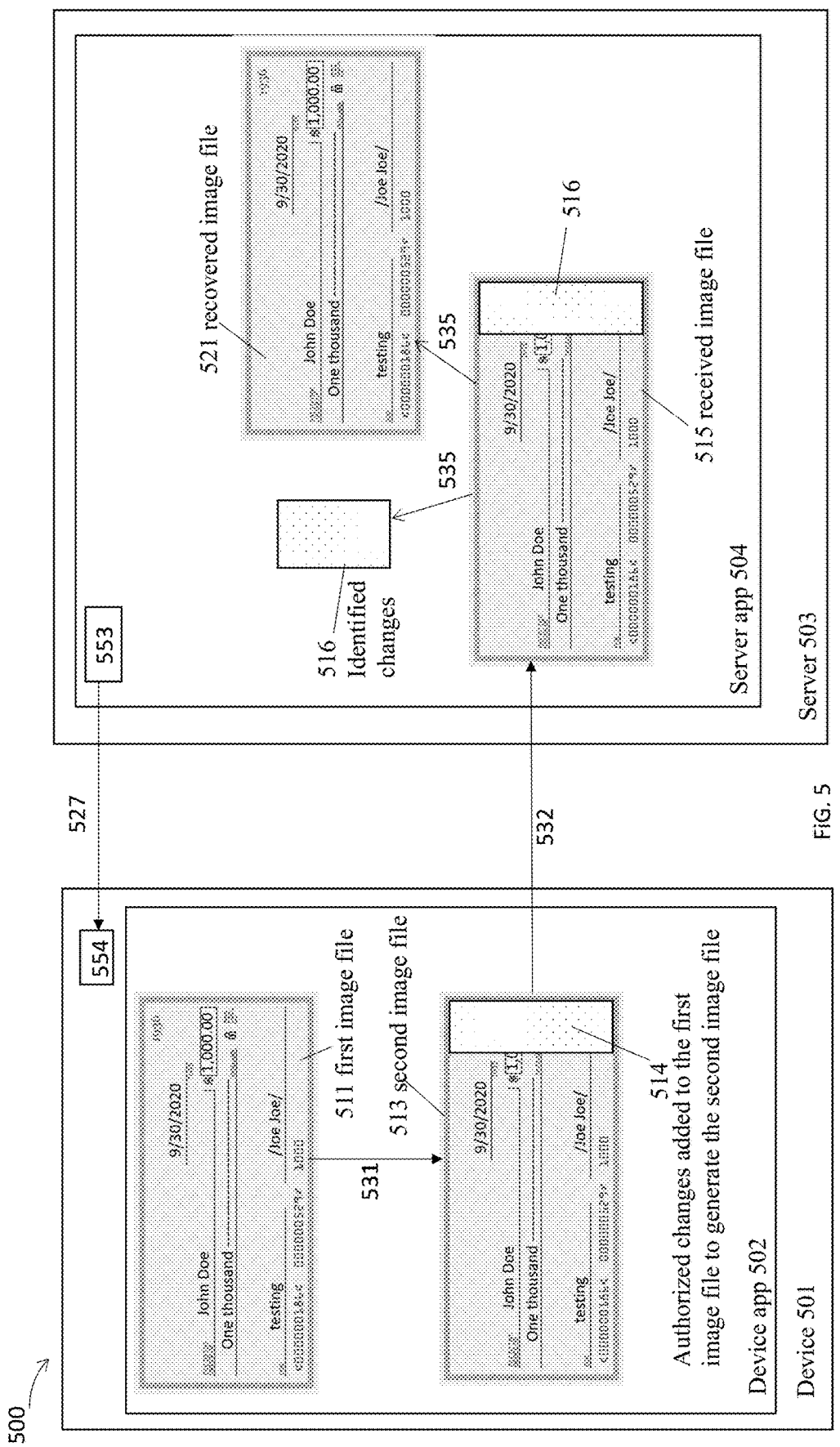
FIG. 5 illustrates another example process for detecting the authenticity of an image file transferred from a client device to a server based on an image authenticity detection configuration determined by a server application, according to an embodiment of the disclosure.

FIG. 5 illustrates another example process 500 for detecting the authenticity of an image file transferred from a device 501 to a server 503 based on an image authenticity detection configuration 553 determined by a server application 504, according to an embodiment of the disclosure. As shown in FIG. 5, the device 501 includes a device application 502, a first image file 511, a second image file 513, and an image authenticity detection configuration 554. In addition, the server 503 includes the server application 504, a received image file 515, a recovered image file 521, and the image authenticity detection configuration 553. The client device 501, the server 503, the device application 502, the server application 504, the first image file 511, the second image file 513, the received image file 515, and the image authenticity detection configuration 553 are similar to the device 201, the server 205, the device application 215, the server application 251, the first image file 216, the second image file 217, the received image file 255, and the image authenticity detection configuration 253, as shown in FIG. 2.

In some examples, at 527, the device 501 can receive the image authenticity detection configuration 553 from the server application 504, and save it as the image authenticity detection configuration 554. Operations performed at 527 can be similar to operations performed during 227 as shown in FIG. 2. The image authenticity detection configuration 553 or 554 can include specific parameters to be used to generate the first image file 511, and authorized changes to be made to the first image file 511 to obtain the second image file 512. The specific parameters, e.g., a resolution, an aspect ratio, a color depth of a pixel, or an image format, can be determined by the server application 504, based on the user data, the device data, or the environment data reported by the device application 502 to the server application 504. For example, the device application 502 can report to the server application 504 that a camera, e.g., the camera 113, can support various resolutions, e.g., 4,920 by 3,264 pixels, 3008 by 2000 pixels, 2048 by 1536 pixels. Depending on the location data of the device, which is reported to the server application 504 as a part of the environment data, the server application 504 can determine that the device 501 can generate the first image file 511 using the resolution 3008 by 2000 pixels. The image authenticity detection configuration 553 or 554 includes the configuration of resolution 3008 by 2000 pixels for the first image file 511.

In some examples, at 531, the device application 502 can generate the first image file 511 based on the parameters indicated by the image authenticity detection configuration 554, and further modify the first image file 511 to become the second image file 513. Operations performed at 531 can be similar to operations performed at 231 shown in FIG. 2. For example, the first image file 511 can be generated by a camera on a smart phone, e.g., the camera 113 of the device 101, using the resolution 3008 by 2000 pixels as indicated by the image authenticity detection configuration 553 or 554.

In some examples, the first image file 511 can include the set of pixels. For example, the set of pixels of the first image file 511 can indicate a check with payee "John Doe," an amount of "1,000.00", a date of "9/30/2020", a check number of "1936", and other information, such as routing number and bank account. The first image file 511 can be in a non-lossy compression format, e.g., PNG format, or in a high fidelity lossy compression format, e.g., JPG.

In some examples, at 531, the device application 502 can modify the first image file 511, based on the authorized changes to be made as indicated by the image authenticity detection configuration 554, to generate the second image file 513. For example, as shown in FIG. 5, the authorized changes include an extra line 514 of pixels along a border of the check image displayed based on the first image file 511. In some examples, the extra line 514 of pixels along the border of the check image can be transparent, non-transparent, or contain a visible text related to the parameters used to generate the first image file 511.

In some examples, adding the extra line 514 of pixels along a border of the check image displayed based on the first image file 511 is merely an example of authorized changes that can be made to the first image file 511 to generate the second image file 513. There can be many other authorized changes. For example, the device application 502 can embed a checksum of information about the camera and device used to capture the first image file 511; use hardware backed device mechanisms, e.g. IPhone® biometric fingerprint touch identification, to encrypt or generate secrets for embedding in the first image file 511; use information about the device 501 or the operating system running on the device 501, e.g., adding an image or text like "captured by Capital One mobile version 5.64 on Android 7.0"; add padding to enforce certain resolutions and/or aspect ratios (e.g. divisible by 6, width must be an odd number); or break the first image file 511 into multiple parts as shown in FIG. 3C.

In some examples, the authorized changes can be added to various parts of the first image files, e.g., the header, the metadata, as shown in FIGS. 3A-3C. In addition, authorized changes can be made to the set of pixels contained in the first image file 511. In particular, watermarking can be used to embed verification information into the image data itself (instead of metadata). For example, a visible image or text, e.g. an image or text like "captured by Capital One mobile version 5.64 on Android 7.0," can be added to the image file 511. The added image of text can be positioned to avoid interfering with other security features in the first image file 511. Alternatively, the first image file 511 can be expanded to make more space for additional security features. For example, some bitwise operations can be performed to apply a covert watermark, which can be reversed on the server 503 to restore the original image. Affected pixels of additional security features can be spread throughout the image to minimize the visual impact. In some other examples, the added image of text can be performed in a reversible (non-covert) way, e.g. inverting the color for the pixels to display a "captured by Capital One mobile . . . " text or some other text. Additional pixels can be added to the set of pixels of the first image file 511, e.g. adding an extra line of transparent pixels along one or more borders. The additional pixels can be added using exposure or white balance to meet a certain distribution or average white balance score for the first image file 511. Besides watermarking techniques, the first image file 511 can be modified by corrupting the set of pixels of the first image file 511 in a reversible way. For example, operations can be performed to corrupt the file headers and/or the set of pixels themselves for the first image file 511. Corrupting the first image file 511 to obtain the second image file 513 can help to protect against attackers manipulating images using photo/image editing programs. Furthermore, corrupting the first image file 511 to obtain the second image file 513 also protects against attackers intercepting and viewing the image file 511 during the transferring from the device 501 to the server 503.

In some examples, the first image file 511 can be an image file of a sequence of image files, e.g., a front part of a document including both a front part and a back part. In such a situation, the metadata of the first image file 511 can be modified sequentially, e.g. to add a checksum following a pseudo random number sequence, to have a correlation between the modifications on the image file for the front part and the image file for the back part of the document. In some other examples, the authorized changes can be sent separately from the first image file 511, e.g., sent by JavaScript object notation (JSON), from the device 501 to the server 503.

In some examples, as illustrated above, many known watermarking, or other authenticity detection techniques can be applied to modify the first image file 511. However, for those known authenticity detection techniques applied to the first image file 511, the parameters used to generate the first image file 511 or the authorized changes to the first image file 511 may be determined by the device 501 itself. In examples shown in FIG. 5, the first image file 511 or the second image file 513 containing the authorized changes to the first image file 511 are generated based on the image authenticity detection configuration 554, which is received from the server application 504. Hence, the server application 504 determines what kind of authenticity detection techniques can be applied to modify the first image file 511, and the parameters used to perform such operations.

In some examples, at 532, after generating the second image file 513 including authorized changes as indicated by the image authenticity detection configuration 554, the device application 502 can send, to the server application 504, the second image file 513. Operations performed at 532 to send the second image file 513 can be similar to operations performed at 232 shown in FIG. 2. Accordingly, the server application 504 can receive, from the device application 502, the received image file 515.

In some examples, at 535, the server application 504 can verify that the received image file 515 conforms with the one or more parameters used to generate the first image file 511 as indicated by the image authenticity detection configuration 554 or 553. Operations performed at 535 can be similar to operations performed at 235 shown in FIG. 2. Parameters about resolutions or other physical properties of the device 501 can be enforced because specific device models often have specific supported resolutions. If the received image file 515 does not conform with the one or more parameters used to generate the first image file 511, then unlikely the received image file 515 is an authentic image file. For example, the image authenticity detection configuration 553 indicates the first image file 511 is generated using the resolution 3008 by 2000 pixels. When the server application 504 detects the received image file 515 is not generated using the resolution 3008 by 2000 pixels as indicated by the image authenticity detection configuration 553, the server application 504 can conclude the received image file 515 is not authentic.

On the other hand, if the received image file 515 conforms with the one or more parameters used to generate the first image file 511 as indicated by the image authenticity detection configuration 554 or 553, the received image file 515 can be potentially authentic. If the received image file 515 is indeed the same as the second image file 513, the received image file 515 should contain the authorized change made to the first image 511. For example, the received image file 515 should contain an extra line of pixels along a border of the check image displayed based on the received image file 515. Hence, the server application 504 can identify changes, e.g., the extra line of pixels 516, contained in the received image file 515, based on the authorized changes to be made to the first image file 511 as indicated by the image authenticity detection configuration 553. After the extra line of pixels 516 has been identified, the server application 504 can validate that the identified changes 516 matches the authorized changes to be made to the first image file 511 as indicated by the image authenticity detection configuration 553.

In some examples, at 535, when the server application 504 successfully verifies that the identified change 516 matches the authorized changes indicated by the image authenticity detection configuration 553, the server application 504 can perform recovery operations to obtain the recovered image file 521, which is deemed to be the authentic copy of the first image file 511 transferred from the device 501.

Figure 6:
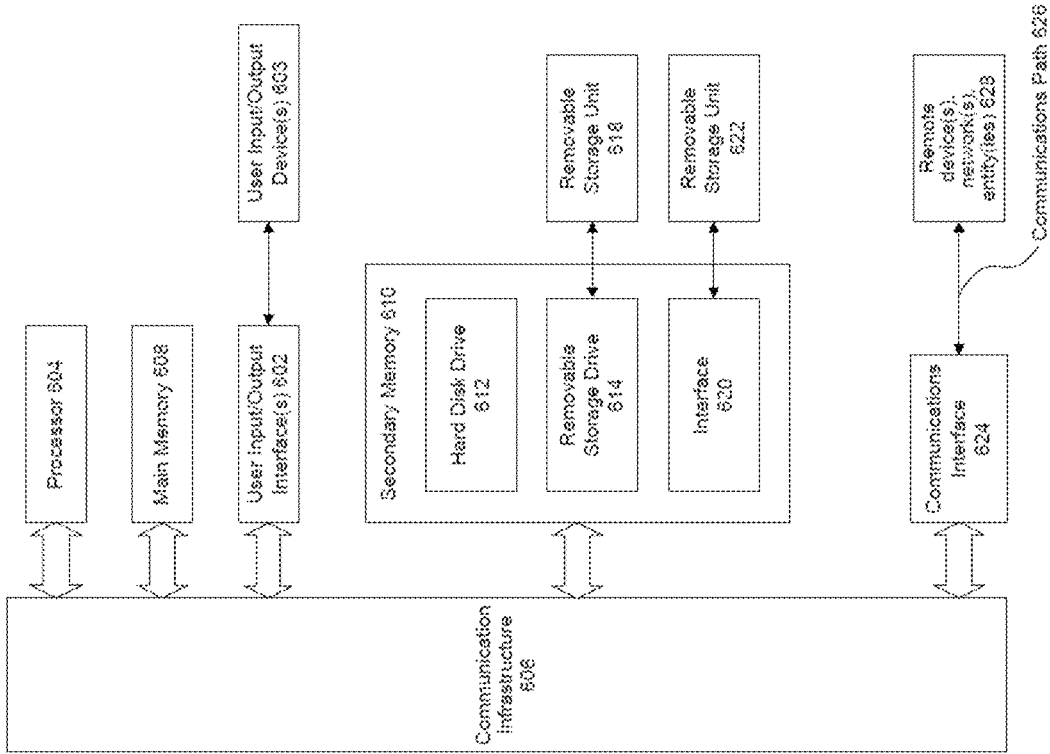
FIG. 6 is a computing environment suitable for implementing systems and methods of detecting image authenticity when an image file is transferred from a device to a server, according to embodiments of the disclosure.

FIG. 6 depicts an example computer system 600 useful for implementing various embodiments. The computer system 600 may be an example of the device 101, the server 105 as shown in FIG. 1, the device 201, the server 205 as shown in FIG. 2, the device 501, the server 503 as shown in FIG. 5.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure or bus 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some examples, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not the Abstract section, is intended to be used to interpret the claims. The Abstract section may set forth one or more but not all exemplary embodiments of the present application as contemplated by the inventor(s), and thus, are not intended to limit the present application and the appended claims in any way.

The present application has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the application that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present application should not be limited by any of the above-described exemplary embodiments, but should be defined only in accordance with the following claims and their equivalents.

What is claimed is:

1. A non-transitory computer-readable medium having instructions stored thereon that, when executed by a device, cause the device to perform operations comprising:
    sending, to a server application operated by a server, user data about a user, device data about the device, or environment data about an environment of the user or the device;
    receiving, from the server application, an image authenticity detection configuration, wherein the image authenticity detection configuration is determined by the server application according to the user data, the device data, or the environment data, and the image authenticity detection configuration indicates parameters to be used to generate a first image file containing a set of pixels generated by an image capturing device of the device according to a resolution selected by the server application according to a set of resolutions supported by the image capturing device and included in the device data, and authorized changes to be made by the device to the first image file;
    modifying the first image file, by the device according to the authorized changes to be made as indicated by the image authenticity detection configuration, to generate a second image file, wherein the second image file contains authorized changes to the set of pixels contained in the first image file, or authorized changes to one or more other components of the first image file; and
    sending, to the server application, the second image file, wherein the second image file is used by the server application to identify changes contained in the second image file, validate that the identified changes contained in the second image file match the authorized changes indicated by the image authenticity detection configuration, and recover the first image file.

2. The non-transitory computer-readable medium of claim 1, wherein the operations further comprise:
    registering the user or the device to supply at least a part of the user data or the device data to the server application.

3. The non-transitory computer-readable medium of claim 1, wherein the operations further comprise:
    generating the first image file based on the parameters indicated by the image authenticity detection configuration, wherein the first image file includes the set of pixels.

4. The non-transitory computer-readable medium of claim 1, wherein the operations further comprise:
    sending to the server application additional information separated from the second image file, wherein the second image file and the additional information are used by the server application to identify changes contained in the second image file, and validate that the identified changes contained in the second image file match the authorized changes indicated by the image authenticity detection configuration.

5. The non-transitory computer-readable medium of claim 1, wherein the user data includes information about a fingerprint of the user, a user biometric data, a user date of birth, or an identification number associated with the user.

6. The non-transitory computer-readable medium of claim 1, wherein the device data includes information about a camera installed on the device, resolutions of the camera, a device model number, or device operating system information.

7. The non-transitory computer-readable medium of claim 1, wherein the environment data includes a time when the device sends to the server application the user data, the device data, or the environment data, or a location where the user is located.

8. The non-transitory computer-readable medium of claim 1, wherein the parameters used to generate the first image file containing the set of pixels include a resolution, an aspect ratio, a color depth of a pixel, or an image format for the first image file.

9. The non-transitory computer-readable medium of claim 1, wherein the authorized changes to the set of pixels contained in the first image file include encrypting the set of pixels by encryption parameters determined by the server application, corrupting the set of pixels by ways determined by the server application, or adding one or more watermarks to the set of pixels determined by the server application.

10. The non-transitory computer-readable medium of claim 1, wherein the authorized changes to the one or more other components of the first image file include adding embedded data to a file header of the first image file, or adding embedded data to metadata of the first image file, wherein the embedded data are generated according to the image authenticity detection configuration, and the user data, the device data, or the environment data.

11. The non-transitory computer-readable medium of claim 1, wherein the operations further comprise:
modifying the first image file, based on the authorized changes to be made as indicated by the image authenticity detection configuration, to generate the second image file and at least a third image file, wherein the second image file or the third image file contains a subset of pixels of the set of pixels contained in the first image file, or changes to the subset of pixels; and
sending, to the server application, the second image file and the third image file, wherein the second image file and the third image file are used by the server application to identify changes contained in the second image file and the third image file, and validate that the identified changes made in the second image file and the third image file match the authorized changes indicated by the image authenticity detection configuration.

12. The non-transitory computer-readable medium of claim 1, wherein the operations further comprise:
modifying a third image file, based on the authorized changes indicated by the image authenticity detection configuration, to generate a fourth image file, wherein the fourth image file contains authorized changes to a set of pixels contained in the third image file, or authorized changes to one or more other components of the third image file, and wherein the authorized changes contained in the fourth image file are correlated to authorized changes contained in the second image file based on a correlation relationship determined by the image authenticity detection configuration; and
sending, to the server application, the fourth image file, wherein the fourth image file is used by the server application to identify changes contained in the fourth image file, and validate that the identified changes contained in the second image file and the identified changes contained in the fourth image file satisfy the correlation relationship determined by the image authenticity detection configuration.

13. A server, comprising:
a storage device;
a processor coupled to the storage device; and
a server application operated by the processor, and configured to:
receive, from a device application, user data about a user, device data about a device, or environment data about the user or the device;
determine, according to the user data, the device data, or the environment data, an image authenticity detection configuration, wherein the image authenticity detection configuration indicates one or more parameters to be used to generate a first image file containing a set of pixels generated by an image capturing device of the device according to a resolution selected by the server application according to a set of resolutions supported by the image capturing device and included in the device data received from the device application, and authorized changes to be made by the device to the first image file, and wherein the authorized changes to be made to the first image file include authorized changes to the set of pixels contained in the first image file, or authorized changes to one or more other components of the first image file;
send, to the device application, the image authenticity detection configuration;
receive, from the device application, a second image file;
verify the received second image file conforms with the one or more parameters to be used to generate the first image file as indicated by the image authenticity detection configuration;
identify changes contained in the second image file, according to the authorized changes to be made to the first image file as indicated by the image authenticity detection configuration;
validate that the identified changes contained in the second image file match the authorized changes to be made to the first image file as indicated by the image authenticity detection configuration; and
recover the first image file from the received second image file when the validation is successful.

14. The server of claim 13, wherein the server application is further configured to receive at least a part of the user data or the device data during a registration process for the user or the device.

15. The server of claim 13, wherein the server application is further configured to:
receive, from the device application, additional information separated from the second image file;
identify, based on the second image file and the additional information, changes contained in the second image file;
validate that the identified changes contained in the second image file match the authorized changes to be made to the first image file as indicated by the image authenticity detection configuration; and
recover the first image file from the received second image file when the validation is successful.

16. The server of claim 13, wherein the authorized changes to the set of pixels contained in the first image file include adding one or more watermarks to the set of pixels according to the image authenticity detection configuration, and wherein a watermark of the one or more watermarks includes a visible text related to the parameters used to generate the first image file, an extra line of transparent pixels along one or more borders of an image displayed based on the first image file, or one or more alterations to the set of pixels contained in the first image file to meet a predetermined distribution of white balance scores.

17. The server of claim 13, wherein the set of pixels of the first image file indicates a financial document, a bank check, a driver's license, a lease, a personal identification number, or an amount of money.

18. The server of claim 13, wherein the parameters used to generate the first image file containing the set of pixels include a resolution, an aspect ratio, a color depth of a pixel, or an image format for the first image file, and wherein the image format for the first image file includes a joint photographic experts group (JPEG) related format, an exchangeable image file format (Exif), a tagged image file format (TIFF), a graphics interchange format (GIF), a portable network graphics (PNG) format, or a WebP format.

19. The server of claim 13, wherein the server application is further configured to provide to the device application a nonce generated based on a security hash function and the user data, the device data, or the environment data.

* * * * *